(12) United States Patent
Menkhoff

(10) Patent No.: US 8,982,972 B2
(45) Date of Patent: Mar. 17, 2015

(54) APPARATUS AND METHOD FOR PROCESSING AN INPUT SIGNAL

(75) Inventor: Andreas Menkhoff, Oberhaching (DE)

(73) Assignee: Intel Mobile Communications GmbH, Neubiberg (DE)

( * ) Notice: Subject to any disclaimer, the term of this patent is extended or adjusted under 35 U.S.C. 154(b) by 249 days.

(21) Appl. No.: 13/459,626

(22) Filed: Apr. 30, 2012

(65) Prior Publication Data

US 2013/0287137 A1    Oct. 31, 2013

(51) Int. Cl.
*H04K 1/00*  (2006.01)
*H04L 27/28* (2006.01)
*H04L 27/26* (2006.01)
*H04B 1/00*  (2006.01)

(52) U.S. Cl.
CPC .......... *H04L 27/2601* (2013.01); *H04B 1/0003* (2013.01)
USPC ....................................................... 375/260

(58) Field of Classification Search
CPC .................................. H04K 1/10; H04L 27/28
USPC ....................................................... 375/260

IPC .................................................. H04L 1/10,27/28
See application file for complete search history.

(56) References Cited

U.S. PATENT DOCUMENTS

2011/0261875 A1* 10/2011 Alexander et al. ............ 375/238

OTHER PUBLICATIONS

Boss, Menkhoff et al, "A Fully Digital multimode polar transmitter employing 17b RF DAC in 3G mode", ISSCC Digitest. Tech. Papers Feb. 2011.*
Boss, Menkhoff et al, "A Fully digital multimode polar transmitter employing 17b RF DAC in 3G mode", ISSCC Digest. Tech. Papers Feb. 2011.

* cited by examiner

*Primary Examiner* — Tanmay Shah
(74) *Attorney, Agent, or Firm* — Eschweiler & Associates, LLC

(57) ABSTRACT

An apparatus includes a digital processing unit configured to process input signals comprising a variable number of data frequency bands. The digital processing unit is configured to set its processing frequency range for processing the input signal based on the number of data frequency bands in the input signal to be processed. Other embodiments are also disclosed.

22 Claims, 9 Drawing Sheets

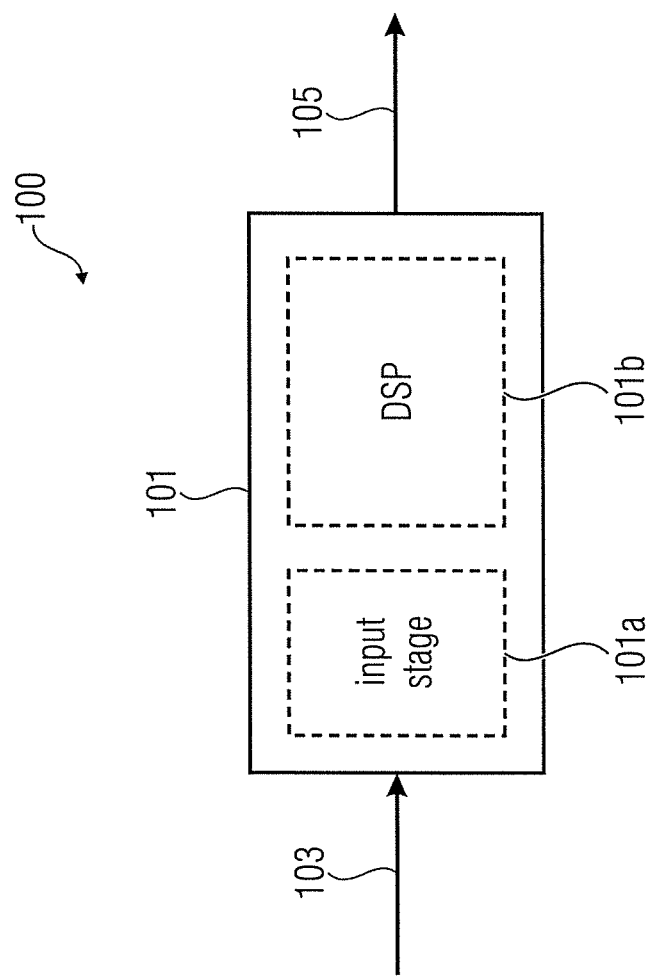

APPARATUS AND METHOD FOR PROCESSING AN INPUT SIGNAL

FIELD

Embodiments of the disclosure relate to an apparatus comprising a digital processing unit for processing an input signal having a variable number of data frequency bands, and to a method for processing such an input signal. Embodiments of the disclosure may be used in a mobile communication device.

BACKGROUND

In mobile transmitters, power consumption is a critical issue, for example due to the limited size and capacity of a battery used for supplying the necessary power. Therefore, high efforts are taken for reducing power consumption in such transmitters. For example, in a mobile transmitter operating in accordance with the LTE standard (long-term evolution), a DSP unit or block (DSP digital signal processing) may be set for different LTE bandwidths. Six settings may be provided, namely respective settings for LTE1.4, LTE3, LTE5, LTE10, LTE15 and LTE20. In accordance with the 3G standard, for allowing high-speed uplink packet access (HSUPA), the DSP block may have two settings, one for a single carrier high-speed uplink packet access and one for a double carrier high-speed uplink packet access. The number of signal operations and thus the power consumption of a digital part of the transmitter, corresponds strongly to the data bandwidth in accordance with the LTE standard or depends on the number of carriers used in accordance with the 3G standard. For example, when considering the LTE standard, when processing input signals in accordance with LTE20, approximately four times the power is needed when compared to processing input signals in accordance with LTE 5. The same is true for the 3G standard in accordance with which the high-speed uplink packet access using two carriers consumes approximately twice the power of the high-speed uplink packet access using only a single carrier.

SUMMARY

Embodiments of the disclosure provide an apparatus comprising a digital signal processing unit configured to process input signals comprising a variable number of data frequency bands, wherein the digital processing unit is configured to set its processing frequency range for processing the input signal based on the number of data frequency bands in the input signal to be processed.

BRIEF DESCRIPTION OF THE DRAWINGS

FIG. 1 shows a block diagram of an apparatus according to an embodiment of the disclosure;

FIG. 2(*b*) shows the data frequency bands in the first frequency range shifted to the center of the second frequency range;

DETAILED DESCRIPTION

Figure 2A:
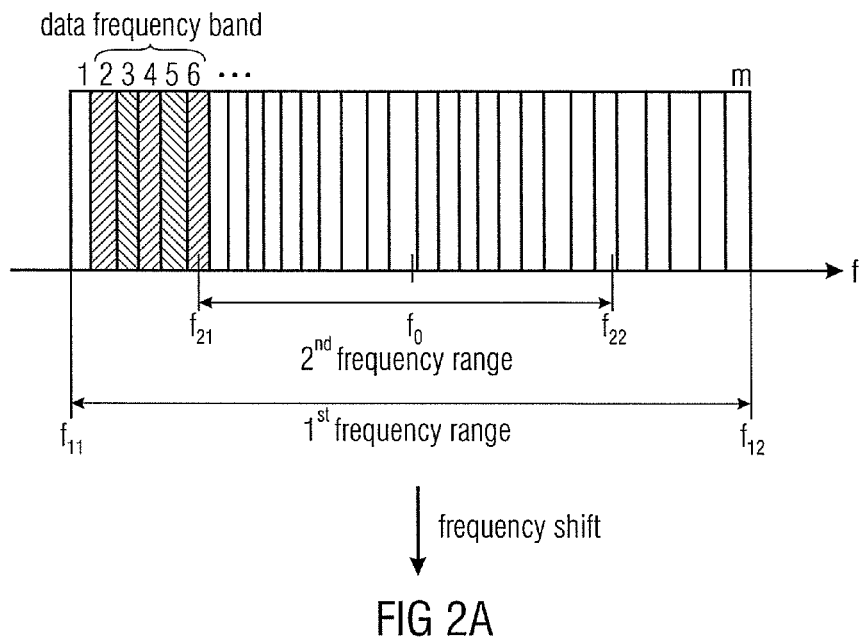
FIG. 2(*a*) shows an example of an input signal supplied to the digital processing unit shown in FIG. 1.

Embodiments of the disclosure will be described on the basis of the accompanying drawings. In the drawings the same elements or elements having the same or similar functionality will be referenced by the same reference signs, and a repeated description of such elements will be omitted.

FIG. 1 shows a block diagram of an apparatus 100 according to an embodiment of the disclosure. The apparatus 100 comprises a digital processing unit 101 which, in accordance with embodiments, may comprise an input stage or data source 101*a* and a digital signal processor (DSP) 101*b*. The input stage 101*a* and the digital signal processor 101*b* may be separate elements in the digital processing unit 101 or may be integrated elements. At the input stage 101*a* an input signal 103 is received which is processed by the digital processing unit 101 for generating an output signal 105. The apparatus 100 may be part of a mobile transmitter which is provided for transmitting data via a wireless link to a mobile or stationary receiver. The input signal 103 spans a predefined frequency range being subdivided in a plurality of frequency bands, referred to in the following as "data frequency bands". Dependent on the amount of data to be transmitted, in a first input signal a first number of data frequency bands may be occupied or associated with data, while in a second and/or further input signals a different number of frequency bands may be associated with data to be transmitted. Thus, the number of data frequency bands in the input signal 103 may vary from one input signal to the next input signal. The data frequency bands, in general, are consecutive bands in the frequency range of the input signal 103, however, it may also be that the data frequency bands are non-consecutive frequency bands.

In accordance with conventional approaches, the digital signal processor 101*b* is set to process an input signal in accordance with a specific predefined bandwidth for generating the output signal 105 which is, for example, forwarded to an analog processing unit including a digital/analog converter for generating an analog signal to be transmitted via an antenna. In general, the processing bandwidth of the DSP 101*b* is set to the largest allowable number of data frequency bands in the input signal 103 and this determines the amount of power needed by the DSP for processing any of the input signals received.

For example, when considering the transmission of data by a mobile transmitter, the data may be represented in a plurality of frequency bands within a specific frequency range which, in general, depends on the transmission standard desired for transmitting the data. Considering for example the LTE standard, an input signal to be transmitted in accordance with LTE20 has a specific frequency range, however, it may well be that not all frequencies or frequency bands available have data associated therewith. For example, in case of an LTE20 input signal having a frequency range of −10 MHz to +10 MHz only frequency bands within a range of −5 MHz to +0 MHz may have data associated therewith. However, since the input signal is in accordance with the LTE20 standard, the mobile transmitter, more specifically the DSP 101b will operate in accordance with the LTE20 standard despite the fact that only a subset of the data frequency bands is occupied or associated with data. Thus, when processing such an LTE20 input signal over its entire bandwidth power will be wasted.

Thus, there is a need to provide an approach for reducing power consumption in mobile transmitters.

In accordance with embodiments of the disclosure this need is addressed by setting the processing frequency range of the DSP 101b (see FIG. 1) for processing the input signal 103 dependent on the number of data frequency bands in the input signal to be processed.

In accordance with embodiments, the digital processing unit may be configured to generate, based on the processed input signal, an output signal comprising an output signal frequency range as defined by a desired transmission standard.

In accordance with embodiments, dependent on the number of data frequency bands in the input signal and on a desired output power of the output signal, the digital processing unit may be configured to vary its processing clock and/or a number of parallel processing blocks of the digital processing unit used for processing the input signal.

In accordance with embodiments, the apparatus may comprise an input unit configured to generate the input signal with an input signal frequency range set in accordance with the number of data frequency bands in the input signal, wherein the digital processing unit is configured to set its processing frequency range based on the input signal frequency range. The input unit may be configured to generate the input signal by performing an FFT on the input signal over the input signal frequency range, the input signal frequency range being smaller than the output signal frequency range.

In accordance with embodiments, the digital processing unit may be configured to receive the input signal, the input signal having an input signal frequency range corresponding to the output signal frequency range, set its processing frequency range in accordance with the frequency range covered by the data frequency bands, in case the number of data frequency bands covers a frequency range smaller than the output signal frequency range, frequency shift the data frequency bands to respective frequency bands in the processing frequency range, process the input signal having the shifted data frequency bands, and frequency shift the data frequency bands of the processed input signal back to the frequencies in the output signal frequency range.

In accordance with embodiments, the digital processing unit may be configured to frequency shift the data frequency band such that a bandwidth of the data is the same before and after frequency shifting, or to frequency shift the data frequency bands to frequency bands around a center frequency of the processing frequency range. The processing frequency range and the output frequency range may have the same center frequency.

In accordance with embodiments, the processing unit may be configured to vary an attenuation or bandwidth of one or more filters dependent on the number of data frequency bands.

In accordance with embodiments, the processing unit may be configured to upsample the input signal, and to vary the sampling frequency dependent on the number of data frequency bands.

In accordance with embodiments, the input and output signals are in the IQ domain, or the input signal is in the IQ domain and the digital processing unit is configured to perform an IQ domain to polar coordinate domain transformation of the input data such that the processed input signal is in the polar coordinate domain.

In accordance with embodiments, the processing unit may comprise an input stage configured to receive the input signal, a digital signal processor configured to process the input signal in accordance with the number of data frequency bands in the input signal, a variable delay block between the input stage and the digital signal processor, and an output stage. The input stage may comprise a mixer configured to cause the frequency shift of the data frequency bands in the input signal.

In accordance with embodiments, in case the input signal and the output signal are in the IQ domain, a mixer may be provided between the digital signal processor and the output stage, the mixer being configured to be controlled by a control signal provided by the input stage, and, in case the input signal is in the IQ domain and the output signal is in the polar coordinate domain, an adder may be provided between the digital signal processor and the output stage, the adder being configured to be controlled by a control signal provided by the input stage.

In accordance with embodiments, the apparatus may comprise a plurality of digital signal processors connected in parallel between the input stage and the output stage, each including a variable delay block, wherein the apparatus is configured to select one or more of the digital signal processors for processing the shifted input signal dependent on the number of data frequency bands in the input signal.

In accordance with embodiments a mobile communication device is provided which comprises a digital baseband processor comprising an apparatus, wherein the apparatus comprises a digital processing unit configured to process input signals comprising a variable number of data frequency bands, and wherein the digital processing unit is configured to set its processing frequency range for processing the input signal based on the number of data frequency bands in the input signal to be processed.

In accordance with embodiments a method for processing input signals comprising a variable number of data frequency bands is provided, wherein the method includes determining from the input signal the number of data frequency bands therein; and based on the determined number of data frequency bands, setting the processing frequency range of a digital processing unit for processing the input signal.

In the following, embodiments of the disclosure will be described in further detail. FIG. 2(a) shows an example of an input signal supplied to the digital processing unit 101 shown in FIG. 1. The input signal comprises a first frequency range from frequency $f_{11}$ to frequency $f_{12}$ and includes frequency bands 1 to m for carrying, at most, m data elements. In FIG. 2(a) also a second frequency range from $f_{21}$ to $f_{22}$ is shown. The first and second frequency ranges have the same center frequency $f_0$. In accordance with embodiments of the disclosure, the digital processing unit 101 is configured such that it can operate on input signals either in the first frequency range or in the second frequency range, wherein, when operating on signals in the second frequency range, the power required for processing the input signal is reduced when compared to the power requiring for processing signals over the entire first frequency range. While the frequency ranges are shown as overlapping and having the same center frequency it is noted that in accordance with embodiments, the respective frequency ranges may only be partially overlapping or may not overlap at all, i.e. do not necessarily have the same center frequency. For the further description it will be assumed that the frequency ranges are shown as in FIG. 2(a). For example, the input signal may have a first frequency range set in accordance with the LTE20 standard and defining m data frequency band for transmitting data. In the example shown in FIG. 2(a) it is assumed that only a subset of the data frequency bands is associated with the data or is "occupied" by data and these frequency bands are shown as hatched frequency bands 1 to 6.

Figure 2B:
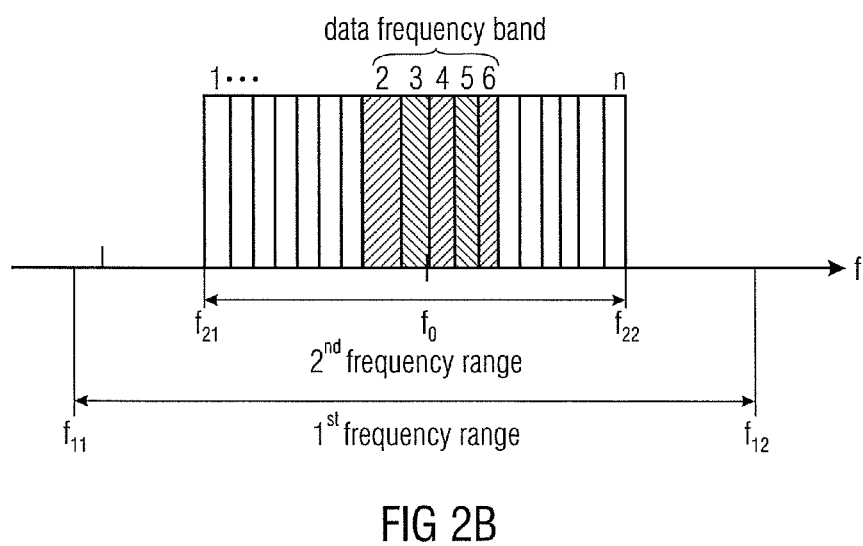

As is shown in FIG. 2(a) the second frequency range covers n data frequency bands, the number of data frequency bands in the second frequency range being smaller than the number of data frequency bands in the first frequency range. The number of data frequency bands in the first frequency range occupied by data or associated with data is smaller than m and is also smaller than n. In accordance with embodiments of the disclosure the digital processing unit 101 (see FIG. 1) is controlled to operate as if an input signal having the second frequency range is received, thereby reducing the power required for processing. In accordance with embodiments, this is achieved by shifting data frequency bands 1 to 6 in the first frequency range to the center of the second frequency range, as is depicted in FIG. 2(b) and setting the digital processing unit to operate only in the second frequency range. After processing the data, to be in compliance with the transmission standard associated with the original input signal having the first frequency range, the processed data is shifted back to the corresponding frequency bands in the first frequency range and is output to the next stage, for example an analog stage for generating the radio signals to be transmitted.

Considering an LTE20 input signal as being the input signal having the first frequency range, the digital processing unit, in accordance with embodiments, may be configured to frequency shift the data from the frequency range between −10 MHz and +10 MHz to the frequency range of −2.5 MHz to +2.5 MHz (LTE5) such that the LTE20 input signal now appears at the processing unit as an LTE5 input signal that may be processed in accordance with the LTE5 standard. The DSP 101b is set to operate on an LTE5 input signal so that less power is required when compared to processing the LTE20 input signal. This power reduction may be achieved because the power consumption of the digital circuit is directly proportional to the sampling frequency so that in case a small input bandwidth is provided, the clock rate used in the digital circuit may be reduced. Further, assuming that the clock of the output stage of the digital circuit is proportional to the input bandwidth, a smaller input bandwidth allows reducing also the clock of the data output stage so that the blocks after the data output stage and the blocks in front of the data output stage may also use a smaller clock. Further, the clock of the input stage or data source may be reduced if the input bandwidth is smaller.

For example, as described above, the LTE20 signal may be frequency-shifted and then decimated by a factor of four to behave like an LTE5 signal. Alternatively, in case the frequency band occupied by the data to be transmitted is already known, the data source may already calculate an LTE5 signal, for example using a 512 point Fast Fourier transformation (FFT), i.e. by generating the input signal to the DSP 101b not using a 2048 point FFT as required for LTE20, but only the just-mentioned 512 pint FFT, thereby generating the LTE5 signal and allowing to reduce the sampling frequency by ¾.

Figure 3:
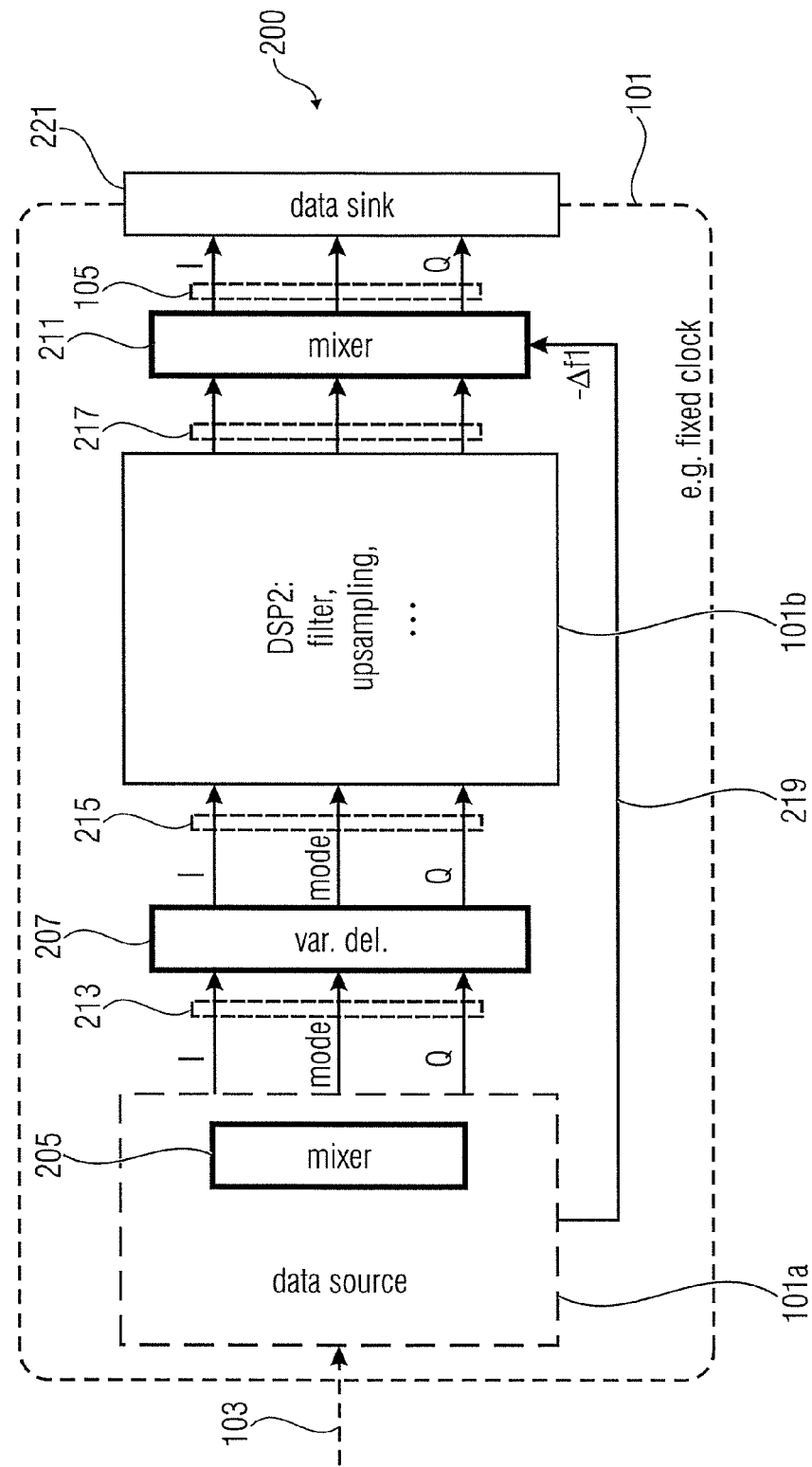
FIG. 3 is a block diagram of an apparatus in accordance with an embodiment of the disclosure that may be provided as part of an IQ modulator or a vector modulator.

FIG. 3 is a block diagram of an apparatus 200 in accordance with an embodiment of the disclosure. The apparatus 100 comprises the digital processing unit 101 receiving the input signal 103. The digital processing unit 101 comprises the input stage or data source 101a and the digital signal processor 101b. The input signal 103 is received at an input of the data source 101a. The data source 101a further comprises a mixer 205. The data source 101a is configured to determine on the basis of the input signal 103 received at its input as to whether the number of data frequency bands occupied or associated with data in the input signal allows for operating the DSP 101b in a mode different from a mode that would be used when all frequency bands of the input signal are occupied. In case it is determined that this is possible, it is further determined to what mode the DSP 101b should be set which is signaled to the DSP 101b via the line "SET". The mixer 205 provides for the necessary shift of the data frequency bands to the center frequency of the newly set operating or processing frequency range of the DSP 101b. The outputs of the data source 101a are connected to the inputs of the DSP 101b via the variable delay block 207, and the signals output by the DSP 101b are provided to a mixer 201 which shifts the processed signal back to the original frequency range for generating the output signal 105. At the output of the data source 101a the shifted signal 213 is present which is applied to the variable delay block 207, and the signal processed in the circuit 101 is in the IQ domain. The signal 213 is subjected to the variable delay be means of the block 207 for generating a shifted and delayed signal 215 applied to the DSP 101b for avoiding glitches due to the different phase positions of the shifted signal when compared to the original signal. More specifically, the variable delay block 207 is used for compensating the different group delays of the different filters used in the DSP 101b, as, for example, narrowband filters have a larger group delay than wideband filters. Thus, dependent on the data frequency range of the shifted signal, for compensating different group delays of the variable filters used in the DSP 101b, the variable delay is applied to the shifted data 219. This reduces or avoids glitch due to the switching between the narrowband filters and wideband filters in the DSP 109b. The mixer 211 receives from the data source 101a a control signal indicating the frequency offset to be applied by the mixer to the processed signal 217 for obtaining the output signal 105 with the data frequency bands at the correct frequencies.

As mentioned above, in accordance with embodiments of the disclosure, processing of the data in the DSP 101b can be performed according to a lower frequency range when compared to the frequency range of the original input signal, for example, a filter attenuation and/or a filter bandwidth of filters used in the DSP and/or a clock frequency and a sampling frequency used in the DSP may be selected to be smaller when the bandwidth of the signal to be processed by DSP 101b is reduced when compared to the original bandwidth of the input signal. Thus, filter attenuation, sampling frequency, clock frequency and/or filter bandwidth may be varied dependent on the number of data frequency bands having actually associated data therewith and required to be processed by the DSP. For example, a narrowband band limitation may be achieved by a multi-rate filter chain. The signal is decimated, then a band limitation is applied and finally the signal is interpolated. Alternatively, one might also use an interpolating filter, for example an interpolating FIR filter or IFIR filter.

As an example, a signal is considered which is to be transmitted within a predetermined bandwidth which is out of a middle frequency of the overall transmit bandwidth or overall transmit frequency range (e.g. in an LTE20 signal only some of the outer resource blocks of the hundred available resource blocks are used). Independent of the bandwidth, the maximum output power of the transmit signal is always the same. The spurious emission mask which is measured in dBc/Hz is always the same. If the transmit signal has a bandwidth of 18 MHz, the output power will be distributed on this 18 MHz, however, if the transmit signal has a bandwidth of only 0.18 MHz, the output power will be distributed on 0.18 MHz. This means that in the first case the filters (used in the DSP 101*b*) should have a 20 dB higher rejection band attenuation, when compared to the second case. In other words, because of the narrow band transmit case it may be necessary to increase the rejection band attenuation of the filters by 20 dB.

According to embodiments of the disclosure the transmit signal is frequency-shifted in the data source 101*a* by the mixer 205. After interpolation of the signal within the DSP 101*b*, the signal is frequency-shifted back to the correct frequency position. Processing the frequency shifted signal allows to clock the complex rejection band filter in the DSP 101*b* with only 1/100 of the input clock required for processing the original signal (e.g. the LTE20 input signal). This results in a decrease of the current consumption to approximately 1/100 of the consumption when processing the original signal. The additional current consumed by the mixers 205, 211 will typically be much lower than the current saved during processing the shifted data.

The output signal 105 may be provided to the data sink 221 which may be a component of the apparatus 200 or may be an external component and may comprise further signal processing components, for example, a digital/analog converter and/or interpolator. Further, additional components for transmitting the processed signal in accordance with the selected transmission standard may be provided, for example, the necessary circuitry for generating and transmitting the radio signal via an antenna.

In FIG. 3, the mixer 205 has been shown as being part of the data source 101*a*, however, the mixer 205 is not necessarily a part of the data source but may be an external block provided between the output of the data source and the variable delay block. The apparatus shown in FIG. 3 may be provided as part of an IQ modulator or a vector modulator as the output signal 105 is provided in the IQ domain.

Figure 4:
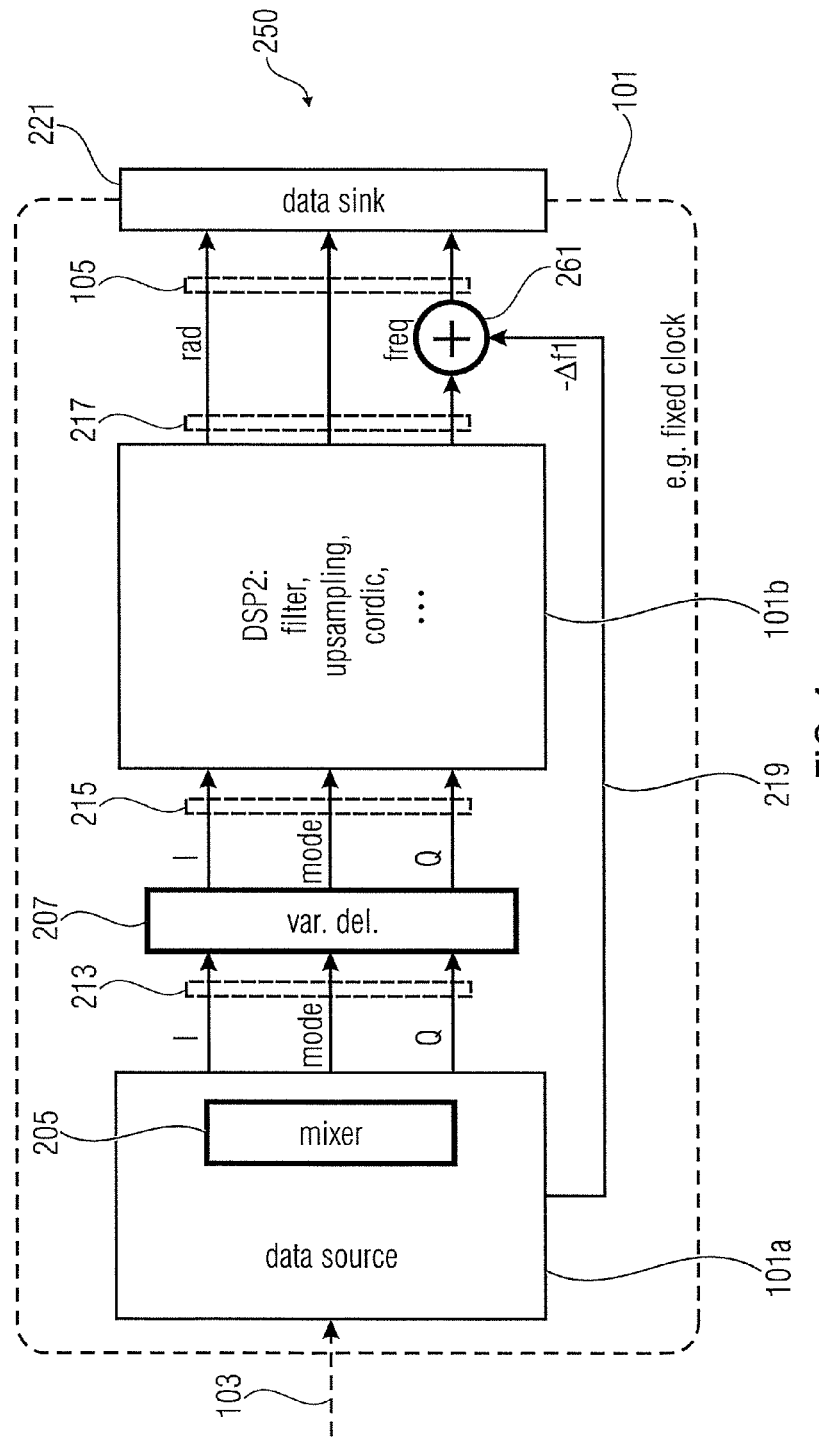
FIG. 4 is a block diagram of an apparatus in accordance with an embodiment of the disclosure that may be provided as part of a polar modulator.

While FIG. 3 shows an apparatus that may be provided in an IQ modulator or a vector modulator, FIG. 4 shows another embodiment in accordance with which the apparatus may be used in a polar modulator performing a modulation based on polar coordinates, such as radius and frequency or amplitude and phase. When compared to FIG. 3, the apparatus 250 has a DSP 101*b* which provides the output data 105 in the polar coordinate domain. The output signal may comprises a radius component and a frequency component. The DSP 101*b* performs the transformation of the input signal in from the IQ domain to the polar coordinate domain, for example by a CORDIC module (coordinate rotation digital computer). An advantage of providing the output signal 105 in the polar coordinate domain may be that shifting the processed signal back to the original first frequency range can be done with a higher rate using an adder 261 which is easier to implement than a complex mixer. The frequency offset for the adder 261 is provided by the data source 101*a*.

As described above, the data included in the input signal 103 may be associated with respective frequency bands or resource blocks, each resource block corresponding to a respective frequency or frequency band in the frequency range. Such resource blocks may be LTE resource blocks. The first frequency range described above with regard to FIG. 2 may be a frequency range of a first LTE bandwidth (e.g., LTE20, LTE15, LTE10, LTE5, LTE3, LTE1.4), and the second frequency range may be a frequency range of another, smaller LTE bandwidth. At full allocation LTE20 may use 100 resource blocks and LTE5 may only use 25 resource blocks. Thus, 25 resource blocks can be transmitted via LTE5, LTE10, LTE15 or LTE20. When an apparatus according to embodiments of the disclosure is in the LTE20 mode and receives an LTE20 input signal in which only a quarter of all resource blocks is used, these resource blocks are shifted the center of the baseband transmit bandwidth so that the LTE20 input signal now actually looks like an LTE5 signal. The DSP can detect this condition and process the input signal accordingly. After processing is completed (e.g., after calculation of an instantaneous frequency) the resulting signal is shifted back in the frequency domain to its original position so that is will appear to the remaining parts of the transmitter as LTE20 signal again. Since such an allocation of frequency bands or resource blocks may vary, e.g. with each OFDM symbol, it is desired that the transition of the frequency does not result in glitches, i.e. it is desired to minimize or even eliminate glitches.

Figure 5:
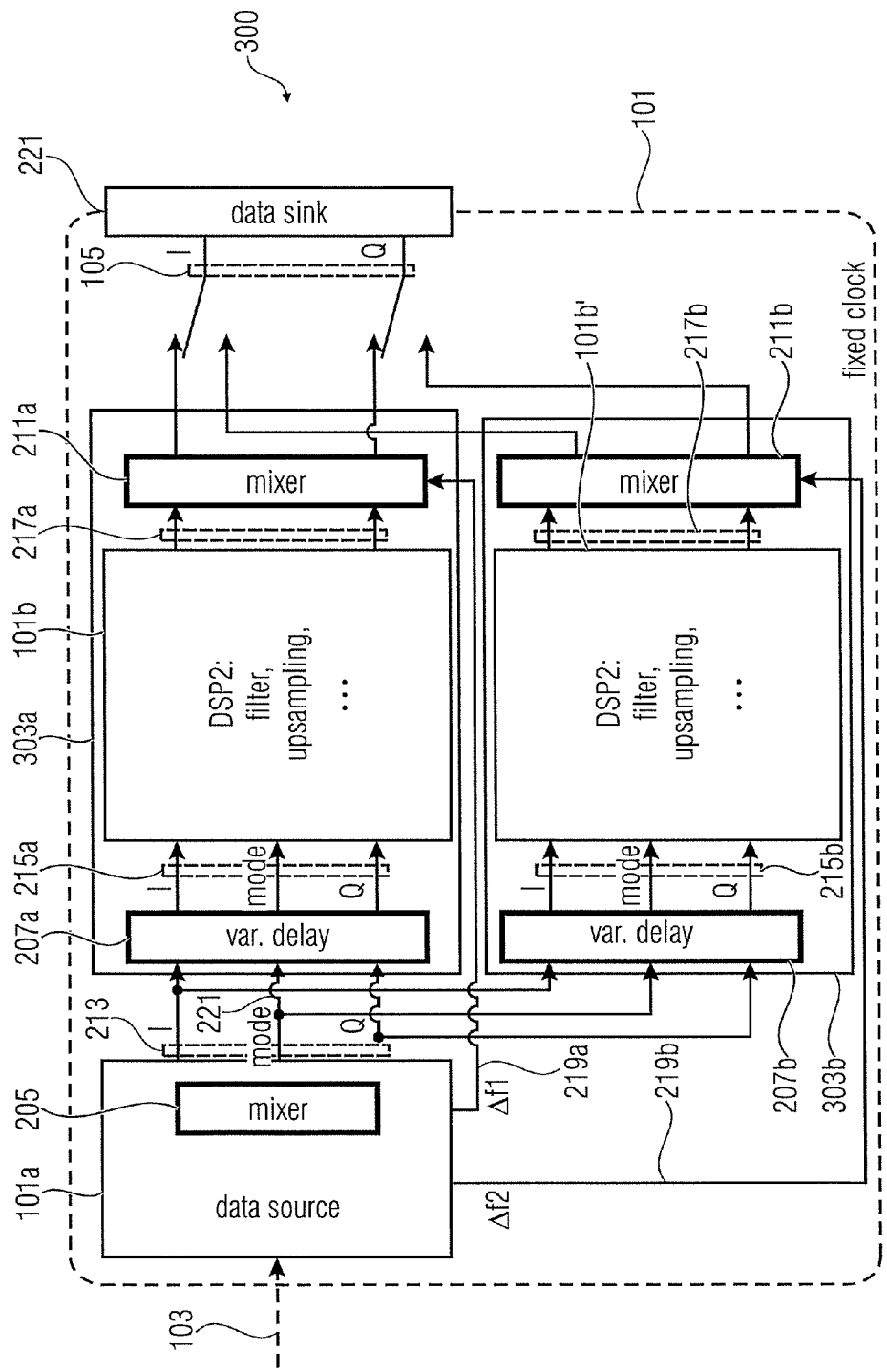
FIG. 5 shows an apparatus in accordance with an embodiment of the disclosure using two digital processing stages and that may be provided as part of an IQ modulator or a vector modulator.

FIG. 5 shows an apparatus 300 in accordance with an embodiment of the disclosure using digital processing chains or stages which are suited for avoiding the above-mentioned glitches. The upper part of the apparatus 300 corresponds substantially to FIG. 3 which has been extended by an additional stage comprising the variable delay block 207*b*, the additional DSP 101*b*' and the additional mixer 201*b*. By respective switching means, the data sink 221 is selectively connectable to the outputs of the first stage comprising DSP 101*b* and the second stage comprising DSP 101*b*', respectively. In accordance with the embodiment of FIG. 5, a first input signal having a first number of data frequency bands is processed in accordance with the bandwidth of the occupied data frequency bands by means of the first DSP 101*b*, and once a change of the data frequency bands occupied is determined, the second DSP 101*b*' is used. The data source 101*a* or the mixer provides a first frequency offset 219*a* and a second frequency offset 219*b* to the mixer 211*a* and the mixer 211*b*, respectively, based on which the mixer performs the frequency shifting of the processed data provided by the respective processing unit back to the first frequency range.

It has been found that glitches which are caused by switching between different transmit bandwidths lead to undesired high frequency components. To prevent such glitches when switching from one transmit bandwidth to another (e.g., when changing from LTE5 to LTE20) the digital processing unit 101 comprises two processing stages or chains 303*a*, 303*b* to prevent such glitches. The first processing stage 303*a* and the second processing stage 303*b* provide the output signal 105 including the processed data in the first frequency range in the IQ domain such that the output signal 105 includes an in-phase component and a quadrature component. The glitches can be prevented or limited if, in advance of an upcoming change of the transmit bandwidth (e.g., a change of number the data frequency bands in the input signal 103), the processing stages 303*a*, 303*b* are operated in parallel such that at the moment of the switching of the transmit bandwidth or an increase or decrease of the data frequency bands both filter chains inside the DSPs 101*b*, 101*b*' are in a steady state. In case of a change of the number of data frequency bands in the input signal the digital processing unit 101 may be configured to operate the first processing stage 303*a* and the second processing stage 303*b* in advance of the change simultaneously. While operating the first and second processing stages 303a, 303b simultaneously the output signal 105 is still provided either by the first processing stage 303a or the second processing stage 303b. After switching from one processing stage to another, the processing stage no longer used for providing the output signal 105 can be deactivated to save current.

The mixers 211a, 211b may have the same phase when working in parallel. A non-causality can be achieved by means of a control signal 221 provided by the data source 203 and/or by means of the delay introduced by the first variable delay stage 207a or the second variable delay stage 207b. According to further embodiments, instead of using the mixers 211a, 211b also a transmit frequency could be changed directly in the PLL (PLL-phase locked loop). For this the internal state variables have to be switched to the new values at the moment of the change of the carrier frequency. An advantage of using the mixers or frequency-back-shifters 211a, 211b over changing the carrier frequency in the PLL is that the point in time of the carrier frequency change is not distributed over several elements.

Figure 6:
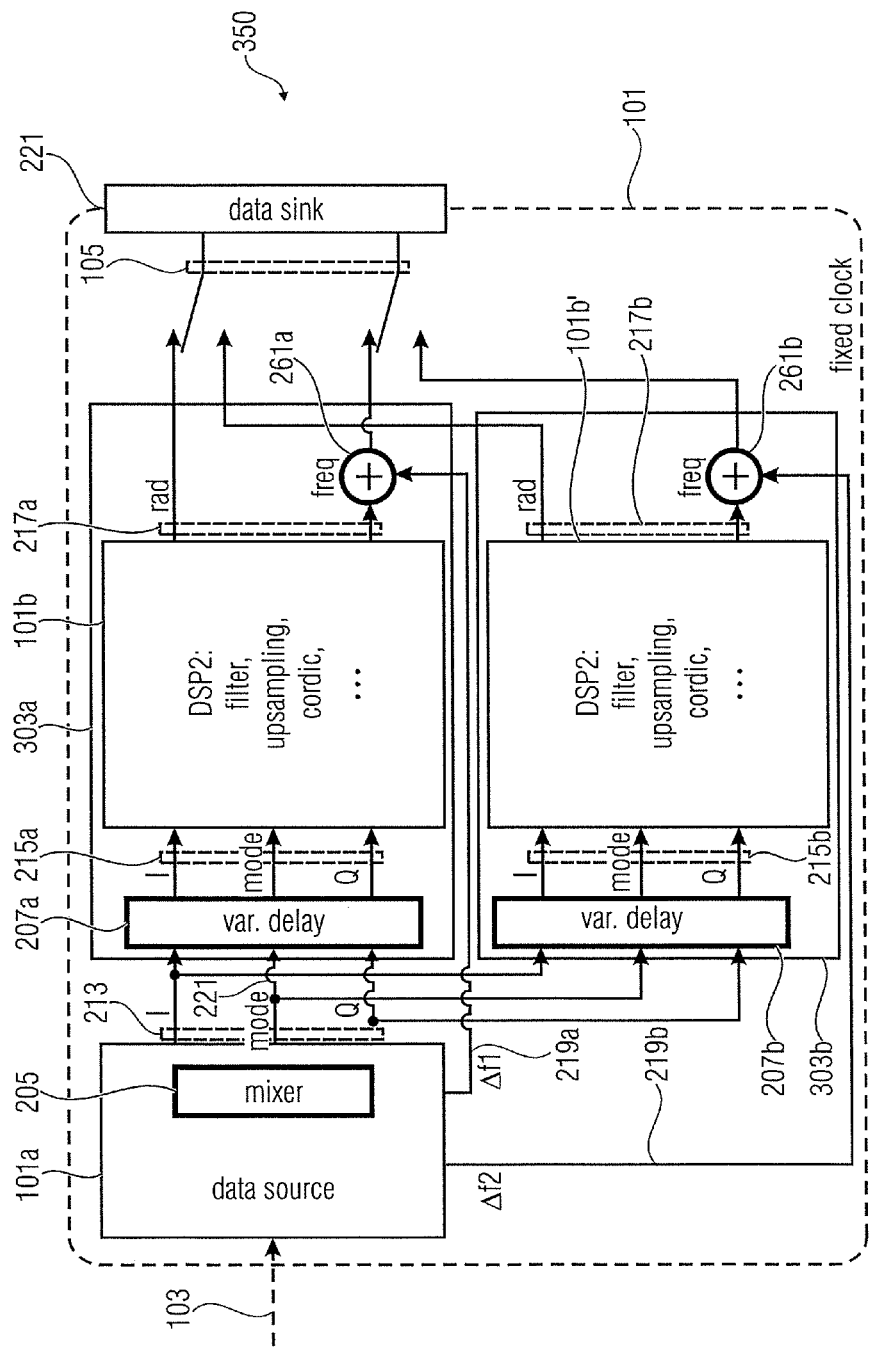
FIG. 6 shows an apparatus in accordance with yet another embodiment of the disclosure which, in a similar manner as in FIG. 5 provides two stages, and that may be provided as part of a polar modulator.

FIG. 6 is yet another embodiment of an apparatus 350 in accordance with the disclosure which, in a similar manner as in FIG. 5 provides two stages, however, like in FIG. 4 has DSPs generating output signals in the polar coordinate domain.

Figure 7:
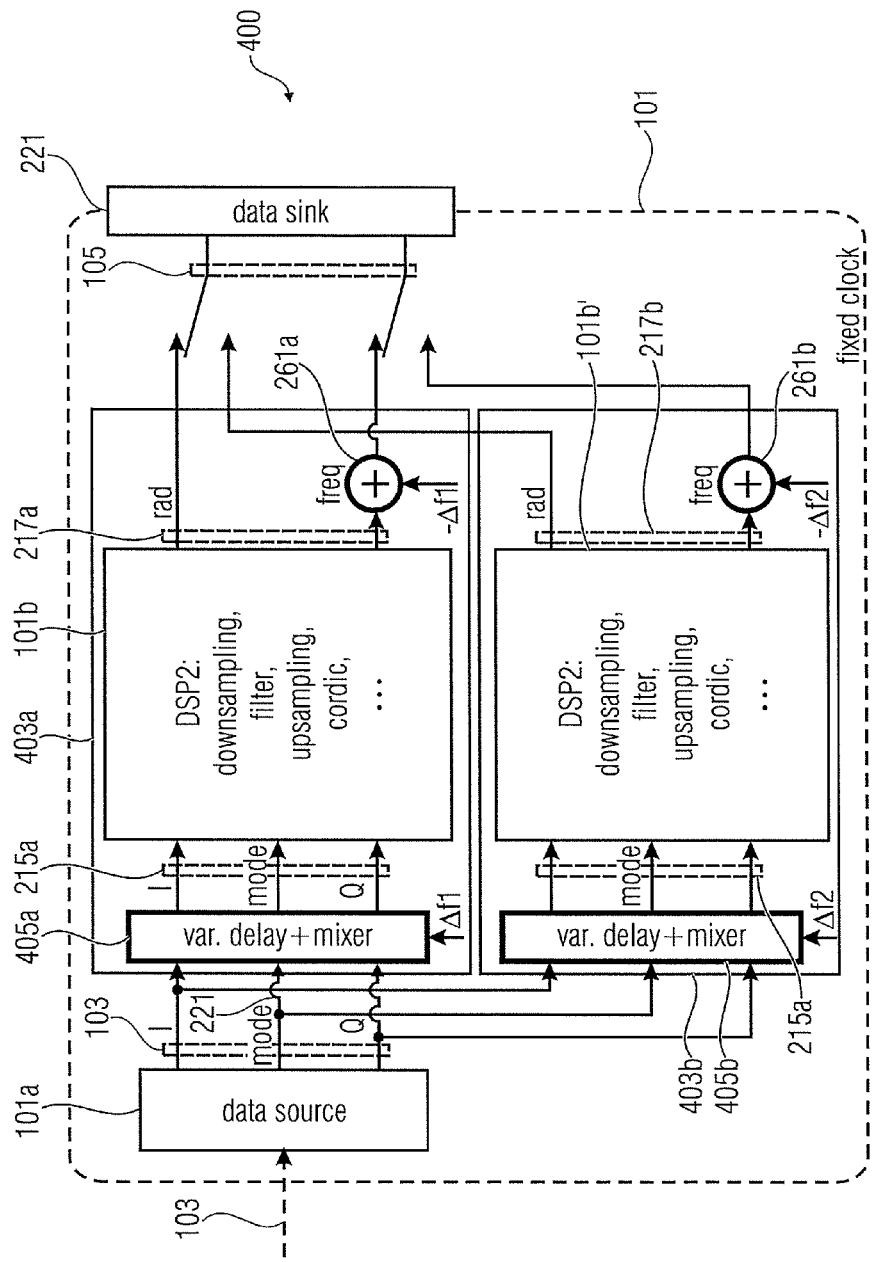
FIG. 7 shows an apparatus according to a further embodiment of the disclosure which differs from the apparatus shown in FIG. 6 in that frequency shifting of the data is done by the respective processing stages.
Figure 8:
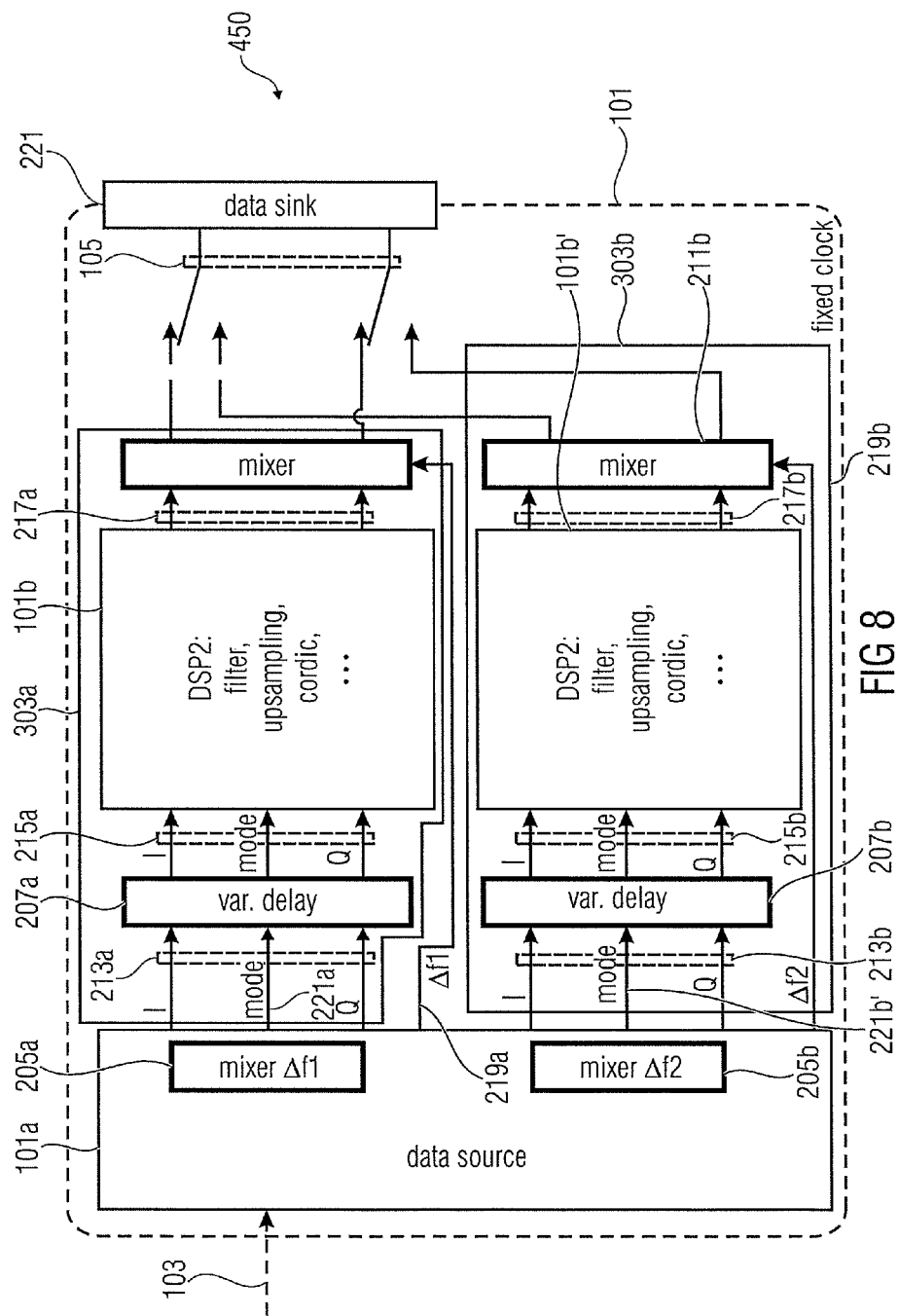
FIG. 8 shows an apparatus according to a further embodiment of the disclosure which differs from the apparatus shown in FIG. 6 in that the data source comprises two mixers.

FIGS. 7 and 8 describe further embodiments of an apparatus in accordance with the disclosure, namely apparatus 400 and 450. Rather than providing the mixer described above in the data source (see miser 205 in FIG. 6), the mixers in apparatus 400 and 450 of FIG. 7 and FIG. 8, respectively, are provided as part of the variable delay block.

FIG. 7 shows an apparatus 400 according to a further embodiment of the disclosure which differs from the apparatus 350 shown in FIG. 6 in that frequency shifting of the data included in the input signal 103 is not done by the data source but by the respective processing stages 403a, 403b. The first and second processing stages each comprise a combined frequency shifting and variable delay stage 405a, 405b. Thus, the frequency shifter 205 shown in FIGS. 3 to 5 may be included together with the variable delay stage.

Although the apparatus shown in FIG. 7 is based on the use of the two processing stages 403a, 403b which are configured to provide the output signal 105 in the polar coordinate domain, this apparatus may also be used for embodiments providing the output signal 105 in the IQ domain. Also the combined frequency shifting and variable delay stage may be used in an apparatus which only employ one processing chain, e.g., in apparatus 200 or 250 of FIG. 3 or FIG. 4, respectively.

FIG. 8 shows an apparatus 450 according to a further embodiment of the disclosure which is configured to provide the output signal 105 in the IQ domain, such that the output signal 105 comprises an In-phase component and a quadrature component. The apparatus 450 differs from the apparatus 300 shown in FIG. 6 in that the data source 101a comprises a first mixer or frequency shifter 205a for providing first shifted data 213a to the first processing stage 303a and a second mixer or frequency-shifter 205b for providing second shifted data 213b to the second processing stage 303b. The data source 101a provides a first mode signal 221a to the first processing stage 303a and a second mode signal 221b to the second processing stage 303b. According to other embodiments, the first and second mixers 205b may be external to the data source 101a. The two mixers or frequency shifters mix the input signal 103 in the region of $f_0$ (center frequency) in the base band. In the mixers or frequency-back-shifters 211a, 211b the processed signal is then shifted back its original position. Embodiments provide for a low power consumption for a low sampling frequency inside the processing stages and therefore for small bandwidths of the data frequency range of the data applied to the processing stages. I may be advantageous to mix the data in the input signal 103 the frequencies around the center frequency $f_0$ of the overall transmit bandwidth. In this case, the use of one frequency shifter 205 may be sufficient (see FIG. 5).

For LTE systems, the frequency shift may already be performed during the resource block allocation. The digital processing unit may allocate the data in the input signal to resource blocks associated with frequencies in the center of the overall transmit bandwidth (e.g. around 0). For such an implementation a hardware realization of the frequency shifter in the data source can be omitted, as only the allocation of the FFT bins is changed. The real frequency shift then happens in the mixer/frequency-back-shifters before the data sink. In general, signals generated in the base band are afterwards shifted by means of a mixer to the correct frequency positions. This mixer may be omitted if the signal should be (independent of the bandwidth) around 0. According to embodiments of the disclosure, the input signal 103 may be a digital baseband signal.

Figure 9:
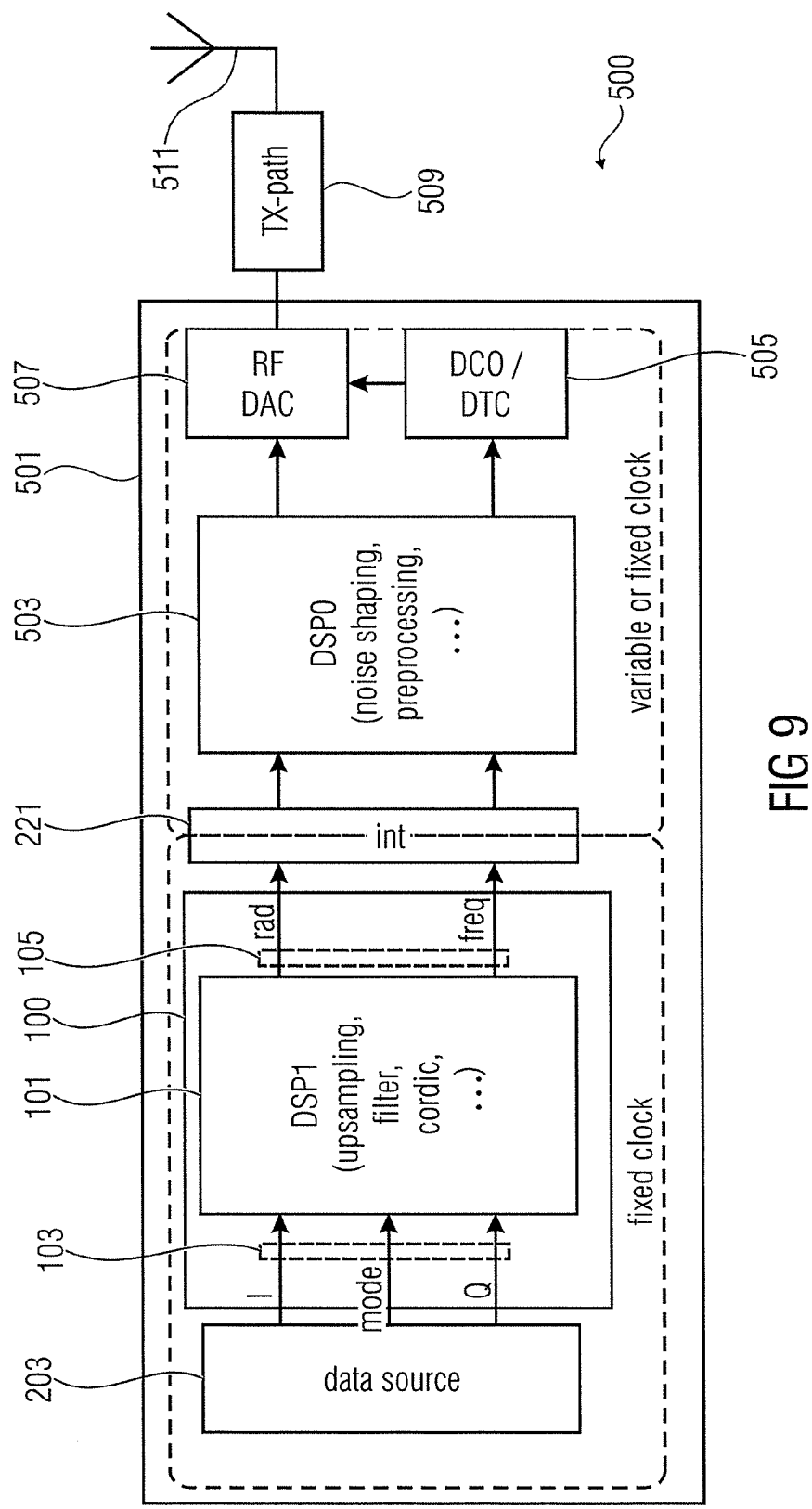
FIG. 9 shows a schematic block diagram of a portable mobile communication device according to an embodiment of the disclosure.

FIG. 9 is shows a schematic block diagram of a portable mobile communication device 500 according to an embodiment of the disclosure. The mobile communication device 500 comprises a transmitter 501 comprising an apparatus in accordance with embodiments of the disclosure. The data sink 221 is implemented as a data dependent interpolator 221 between a fixed clock and a variable clock which is derived from a DCO frequency. Further, the transmitter 501 comprises a digital signal processor 503 configured to perform a digital signal processing on the output signal 105 provided by the apparatus 100, e.g., noise shaping and/or preprocessing. The transmitter 501 comprises an oscillator circuit 505, e.g., a DCO (digitally controlled oscillator) or a DTC (digital to time converter), and an RF-DAC 507 (RF-DAC—radio frequency digital to analog converter). In the embodiment described in FIG. 9, the transmitter 500 is implemented as a polar transmitter. Nevertheless, it may also be implemented as an IQ or a vector transmitter.

Typically the apparatus is implemented in the stage of the transmitter 501 having the fixed clock, independent of a carrier frequency of a resulting RF output signal of the transmitter 501 at an output of the RF-DAC 507. The mobile communication device 500 may comprise a TX path or transmit path 509, e.g., comprising one or more filters and/or power amplifiers, and an antenna 511, wherein the TX path 509 may be coupled between the RF-DAC 507 and the antenna 511. The apparatus 100 may be part of a baseband processor of the mobile communication device 500 which is configured to provide the output signal 105 to the interpolator 221.

According to embodiments of the disclosure the mobile communication device 500 may be a portable mobile communication device. The mobile communication device 500 may perform a voice and/or data communication, e.g., according to a mobile communication or transmission standard with another portable mobile communication device and/or a mobile communication base station. The portable mobile communication device may be a mobile handset, e.g., a mobile phone or cell phone, a smart phone or a tablet PC, a broad band modem, a notebook or a laptop but also a router or a personal computer.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, some one or more of the most important method steps may be executed by such an apparatus.

Depending on certain implementation requirements, embodiments of the disclosure can be implemented in hardware or in software. The implementation can be performed using a digital storage medium, for example a floppy disk, a DVD, a Blue-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable. Some embodiments according to the disclosure comprise a data carrier having electronically readable control signals, which are capable of cooperating with a programmable computer system, such that one of the methods described herein is performed. Generally, embodiments of the disclosure can be implemented as a computer program product with a program code, the program code being operative for performing one of the methods when the computer program product runs on a computer. The program code may for example be stored on a machine readable carrier. Other embodiments comprise the computer program for performing one of the methods described herein, stored on a machine readable carrier. In other words, an embodiment of the inventive method is, therefore, a computer program having a program code for performing one of the methods described herein, when the computer program runs on a computer.

A further embodiment is a data carrier (or a digital storage medium, or a computer-readable medium) comprising, recorded thereon, the computer program for performing one of the methods described herein. The data carrier, the digital storage medium or the recorded medium are typically tangible and/or non-transitionary.

A further embodiment is a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein. A further embodiment comprises a computer having installed thereon the computer program for performing one of the methods described herein. A further embodiment according to the disclosure comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are preferably performed by any hardware apparatus.

The above described embodiments are merely illustrative for the principles of the disclosure. It is understood that modifications and variations of the arrangements and the details described herein will be apparent to others skilled in the art. It is the intent, therefore, to be limited only by the scope of the impending patent claims and not by the specific details presented by way of description and explanation of the embodiments herein. Although each claim only refers back to one single claim, the disclosure also covers any conceivable combination of claims.

What is claimed is:

1. An apparatus, comprising:
    a digital processing unit configured to process input signals comprising a variable number of data frequency bands,
    wherein the digital processing unit is configured to set its processing frequency range for processing the input signal based on a number of data frequency bands in the input signal to be processed;
    wherein the digital processing unit is configured if further configured to generate, based on the processed input signal, an output signal comprising an output signal frequency range as defined by a desired transmission standard; and
    wherein the digital processing unit is further configured to:
        receive the input signal, the input signal having an input signal frequency range corresponding to the output signal frequency range,
        set its processing frequency range in accordance with the frequency range covered by the data frequency bands, in case the number of data frequency bands covers a frequency range smaller than the output signal frequency range,
        frequency shift the data frequency bands to respective frequency bands in the processing frequency range,
        process the input signal having the shifted data frequency bands, and
        frequency shift the data frequency bands of the processed input signal back to the frequencies in the output signal frequency range.

2. The apparatus of claim 1, wherein dependent on the number of data frequency bands in the input signal and on a desired output power of the output signal, the digital processing unit is configured to vary its processing clock or a number of parallel processing blocks of the digital processing unit used for processing the input signal.

3. The apparatus of claim 1, comprising:
    an input unit configured to generate the input signal with an input signal frequency range set in accordance with the number of data frequency bands in the input signal,
    wherein the digital processing unit is configured to set its processing frequency range based on the input signal frequency range.

4. The apparatus of claim 3, wherein the input unit is configured to generate the input signal by performing a fast Fourier transform (FFT) on the input signal over the input signal frequency range, the input signal frequency range being smaller than the output signal frequency range.

5. The apparatus of claim 1, wherein the digital processing unit is configured to frequency shift the data frequency band such that a bandwidth of the data is the same before and after frequency shifting.

6. The apparatus of claim 1, wherein the digital processing unit is configured to frequency shift the data frequency bands to frequency bands around a center frequency of the processing frequency range.

7. The apparatus of claim 1, wherein the processing frequency range and the output frequency range have the same center frequency.

8. The apparatus of claim 1, wherein the processing unit is configured to vary an attenuation or bandwidth of one or more filters dependent on the number of data frequency bands.

9. The apparatus of claim 1, wherein the processing unit is configured to upsample the input signal, and to vary the sampling frequency dependent on the number of data frequency bands.

10. The apparatus of claim 1, wherein the input and output signals are in the IQ domain.

11. The apparatus of claim 1, wherein the input signal is in the IQ domain, the digital processing unit is configured to perform an IQ domain to polar coordinate domain transformation of the input data such that the processed input signal is in the polar coordinate domain.

12. The apparatus of claim 1, wherein the processing unit comprises:
    an input stage configured to receive the input signal,
    a digital signal processor configured to process the input signal in accordance with the number of data frequency bands in the input signal,
    a variable delay block between the input stage and the digital signal processor, and
    an output stage.

13. The apparatus of claim 12, wherein the input stage comprises a mixer configured to cause the frequency shift of the data frequency bands in the input signal.

14. The apparatus of claim 13, wherein, in case the input signal and the output signal are in the IQ domain, a mixer is provided between the digital signal processor and the output stage, the mixer being configured to be controlled by a control signal provided by the input stage.

15. The apparatus of claim 13, wherein in case the input signal is in the IQ domain and the output signal is in the polar coordinate domain, an adder is provided between the digital signal processor and the output stage, the adder being configured to be controlled by a control signal provided by the input stage.

16. The apparatus of claim 12, comprising:
    a plurality of digital signal processors connected in parallel between the input stage and the output stage, each including a variable delay block,
    wherein the apparatus is configured to select one or more of the digital signal processors for processing the shifted input signal dependent on the number of data frequency bands in the input signal.

17. An apparatus, comprising:
    an input stage configured to receive input signals, the input signals having a variable number of data frequency bands,
    a digital signal processor configured to process an input signal received at the input stage, and to generate, based on the processed input signal, an output signal having an output signal frequency range as defined by a desired transmission standard,
    a variable delay block between the input stage and the digital signal processor, and
    an output stage,
    wherein the digital signal processor is configured to:
    receive the input signal, the input signal having an input signal frequency range corresponding to the output signal frequency range,
    set its processing frequency range in accordance with the frequency range covered by the data frequency bands, in case the number of data frequency bands covers a frequency range smaller than the output signal frequency range,
    frequency shift the data frequency bands to respective frequency bands in the processing frequency range,
    process the input signal having the shifted data frequency bands, and
    frequency shift the data frequency bands of the processed input signal back to the frequencies in the output signal frequency range.

18. An apparatus, comprising:
    an input stage configured to receive an input signal, the input signal having an input signal frequency range corresponding to the output frequency range,
    a digital signal processor configured to process the input signal,
    means for determining from the input signal the number of data frequency bands therein and for setting the processing frequency range of the digital signal processor for processing the input signal based on the number of data frequency bands in the input signal to be processed,
    means for setting the processing frequency of the digital signal processor in accordance with the frequency range covered by the data frequency bands, in case the number of data frequency bands covers a frequency range smaller than the output signal frequency range,
    means for frequency shifting the data frequency bands to respective frequency bands in the processing frequency range,
    means for processing the input signal having the shifted data frequency bands, and
    means for frequency shifting the data frequency bands of the processed input signal back to the frequencies in the output signal frequency range.

19. A mobile communication device, comprising:
    a digital baseband processor comprising an apparatus,
    wherein the apparatus comprises a digital processing unit configured to process input signals comprising a variable number of data frequency bands, and
    wherein the digital processing unit is configured to set its processing frequency range for processing an input signal based on a number of data frequency bands in an input signal to be processed,
    wherein the digital processing unit is further configured to:
    receive the input signal, the input signal having an input signal frequency range corresponding to the output signal frequency range,
    set its processing frequency range in accordance with the frequency range covered by the data frequency bands, in case the number of data frequency bands covers a frequency range smaller than the output signal frequency range,
    frequency shift the data frequency bands to respective frequency bands in the processing frequency range,
    process the input signal having the shifted data frequency bands, and
    frequency shift the data frequency bands of the processed input signal back to the frequencies in the output signal frequency range.

20. A method for processing input signals comprising a variable number of data frequency bands, the method comprising:
    determining from an input signal a number of data frequency bands therein; and
    based on the determined number of data frequency bands, setting a processing frequency range of a digital processing unit for processing the input signal, based on the processed input signal, generating an output signal comprising an output signal frequency range as defined by a desired transmission standard, receiving the input signal, the input signal having an input signal frequency range corresponding to the output signal frequency range, setting the processing frequency range of the digital signal processor in accordance with the frequency range covered by the data frequency bands, in case the number of data frequency bands covers a frequency range smaller than the output signal frequency range, frequency shifting the data frequency bands to respective frequency bands in the processing frequency range, processing the input signal having the shifted data frequency bands, and frequency shifting the data frequency bands of the processed input signal back to frequencies in the output signal frequency range.

21. The method of claim 20, comprising:

generating the input signal with an input signal frequency range set in accordance with the determined number of data frequency bands, wherein setting the processing frequency range of the digital processing unit comprises setting the processing frequency range based on the input signal frequency range.

22. A non-transitory storage medium having stored thereon a computer program having a program code for performing, when running on a computer, a method for processing input signals comprising a variable number of data frequency bands, the method comprising:

determining from the input signal the number of data frequency bands therein; and based on the determined number of data frequency bands, setting the processing frequency range of a digital processing unit for processing the input signal, receiving the input signal, the input signal having an input signal frequency range corresponding to the output signal frequency range, setting the processing frequency range of the digital signal processor in accordance with the frequency range covered by the data frequency bands, in case the number of data frequency bands covers a frequency range smaller than the output signal frequency range, frequency shifting the data frequency bands to respective frequency bands in the processing frequency range, processing the input signal having the shifted data frequency bands, and frequency shifting the data frequency bands of the processed input signal back to frequencies in the output signal frequency range.

* * * * *